United States Patent [19]
Abramovich et al.

[11] Patent Number: 5,212,444
[45] Date of Patent: May 18, 1993

[54] DETECTION OF DAMPED SINE WAVES IN A MAGNESTOSTRICTIVE DISPLACEMENT TRANSDUCER USING PRETRIGGER AND DETECTION THRESHOLDS OF OPPOSITE POLARITY

[75] Inventors: Igor A. Abramovich; Neil McKenna, both of Simsbury, Conn.

[73] Assignee: Magnetek Controls, Clawson, Mich.

[21] Appl. No.: 738,613

[22] Filed: Jul. 31, 1991

[51] Int. Cl.$^5$ .................... G01B 7/14; G01F 23/30
[52] U.S. Cl. ........................... 324/207.13; 324/207.22; 324/207.24
[58] Field of Search ................... 324/207.11, 207.13, 324/207.22, 207.24, 262; 307/350, 354, 360; 328/135

[56] References Cited

U.S. PATENT DOCUMENTS 4,193,028  3/1980  Downs, II ..................... 307/360
4,634,973  1/1987  Murakami et al. ............ 324/207.13
4,943,773  7/1990  Koski et al. .................... 324/207

Primary Examiner—Walter E. Snow
Attorney, Agent, or Firm—Krass & Young, P.C.

[57] ABSTRACT

A damped sine wave detector for detecting the response of a magnetostrictive displacement transducer. A pretrigger comparator compares the signal to a predetermined negative threshold. A signal comparator compares the input signal to a predetermined positive threshold. The pretrigger comparator turns on a pretrigger flip-flop and starts a delay timer when the input signal falls below the predetermined negative threshold. The pretrigger flip-flop supplies the data input of a signal flip-flop. The signal flip-flop is clocked by the signal comparator when the input signal is above the predetermined positive threshold. The signal flip-flop turns on if clocked and the pretrigger flip-flop is on. The detector includes two timers for resetting the flip-flops. An inhibit timer resets both flip-flops upon expiration of an inhibit time longer than the maximum expected duration of the damped sine wave signal. A delay timer resets only the pretrigger flip-flop after a delay time greater than the maximum expected interval between when the damped sine wave falls below the predetermined negative threshold and when the damped sine wave rises above the predetermined positive threshold. Thus the circuit is less sensitive to noise.

26 Claims, 3 Drawing Sheets

5,212,444

DETECTION OF DAMPED SINE WAVES IN A MAGNESTOSTRICTIVE DISPLACEMENT TRANSDUCER USING PRETRIGGER AND DETECTION THRESHOLDS OF OPPOSITE POLARITY

TECHNICAL FIELD OF THE INVENTION

The technical field of the present invention is that of reliable detection of damped sine waves, and more particularly reliable detection of such damped sine waves that are the response of a magnetostrictive displacement transducer.

BACKGROUND OF THE INVENTION

The usefulness of the phenomenon of magnetostrictivity in linear displacement or position measuring devices is recognized by the prior art; for example, see Redding, U.S. Pat. No. 4,305,283; McCrea et al, U.S. Pat. No. 4,158,964; Krisst, U.S. Pat. No. 4,071,818; Edwards, U.S. Pat. No. 4,028,619; and Tellerman, U.S. Pat. No. 3,898,555. Common to several of these devices are a magnetostrictive wire which runs in a straight line path through the measurement field, means for inducing a torsional strain at a given position along the wire, and a magnet displaceable along the wire, either by connection to a movable body such as a machine tool or by reason of association with a float device. Generally speaking, the position of the magnet represents the position of the monitored quantity and is determined as a function of the time required for a torsional ultrasonic disturbance to propagate from one end of the wire through the area of influence of the magnet or from the position of the magnet to a sensing apparatus located at one end of the wire.

There is a problem with the devices of the prior art. Accurate displacement measurement depends upon accurate determination of the time of arrival of the magnetostrictive response. Whether the magnetostrictive wire is electrically excited and the mechanical response detected or vice versa, the magnetostrictive response is generally in the form of a damped sine wave. Accurate determination of a reliable position within such a damped sine wave is a difficult problem.

U.S. Pat. No. 4,943,773 issued Jul. 24, 1990 to Koski et al proposes a solution to this problem. This patent proposes to make the time determination based upon the first zero crossing after the signal passes a predetermined threshold value. This technique is generally acceptable but in many instances false signals can be caused by noise.

Therefore there is a need in the art for a damped sine wave detection technique which reliably finds the same point within the signal. This would be particularly useful in magnetostrictive displacement transducers.

SUMMARY OF THE INVENTION

This invention detects damped sine waves such as the response of a magnetostrictive displacement transducer. Such magnetostrictive displacement transducers include: a magnetostrictive wire defining a measurement interval; a return wire electrically coupled to the foot end of the magnetostrictive wire; a magnet movable along the magnetostrictive wire marking the position to be detected; an electrical excitation means producing a predetermined electrical excitation through the magnetostrictive wire and return wire; a torsional motion sensor generating an electrical indication of torsional motion within said magnetostrictive wire; and a damped sire wave detector. This damped sine wave detector must ideally reliably detect a point within the damped sine wave response of the magnetostrictive displacement transducer.

The damped sine wave detector includes two comparators receiving the damped sine wave. A pretrigger comparator receives the signal on a non-inverting input and receives a predetermined negative threshold voltage on an inverting input. The predetermined negative threshold voltage is about ⅔ of expected maximum negative voltage swing of the damped sine wave signal. A signal comparator receives the input signal on an inverting input and receives predetermined positive threshold voltage on an non-inverting input. The predetermined positive threshold voltage may be any voltage between the predetermined negative threshold voltage and the maximum expected signal voltage, but is preferably a small positive voltage about 100 millivolts. The pretrigger comparator turns ON a pretrigger flip-flop when the input signal falls below the predetermined negative threshold voltage. This pretrigger flip-flop supplies the data input of a signal flip-flop. This signal flip-flop is clocked by the signal comparator when the input signal is above the predetermined positive threshold voltage. Thus the signal flip-flop turns ON if clocked and the pretrigger flip-flop is ON.

The damped sine wave detector includes two timers for resetting the flip-flops. An inhibit timer is started when the signal flip-flop turns ON. This inhibit timer resets both flip-flops upon expiration of an inhibit time longer than the maximum expected duration of the damped sine wave signal. This inhibit timer prevents multiple triggering from later portions of the same damped sine wave signal. A delay timer is started when the pretrigger flip-flop turns ON. This delay timer resets only the pretrigger flip-flop after a delay time greater than the maximum expected interval between when the damped sine wave falls below the predetermined negative threshold voltage and when the damped sine wave rises above said predetermined positive threshold voltage. An OR gate permits either the inhibit timer or the delay timer to reset the pretrigger flip-flop. This delay time resets the pretrigger flip-flop unless the signal flip-flop is triggered within its delay time. Thus the circuit is less sensitive to noise.

BRIEF DESCRIPTION OF THE DRAWINGS

These and other objects and aspects of the present invention will become clear from the following description of the invention, in which:

FIGS. 5a to 5f illustrate examples of wave forms typically encountered in the circuit of FIG. 4;

DETAILED DESCRIPTION OF THE PREFERRED EMBODIMENTS

Figure 1:
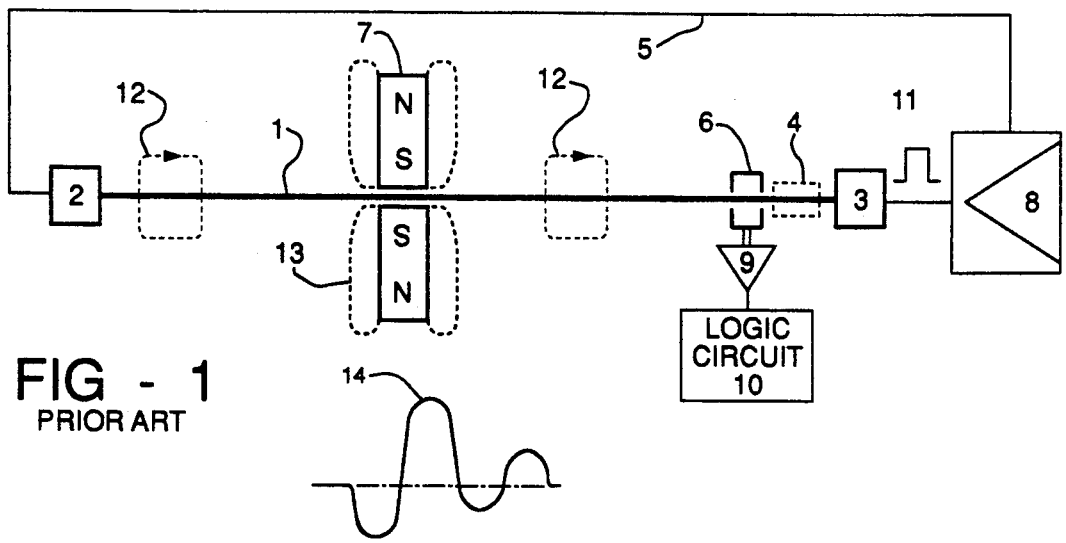
FIG. 1 illustrates a magnetostrictive displacement transducer of the known type to which the present invention is applicable.

This invention relates to the improvement in the noise immunity in the magnetostrictive displacement transducers. FIG. 1 shows the principle of operation of the most commonly used magnetostrictive displacement transducers. The magnetostrictive displacement transducer consists of a piece of magnetostrictive wire 1, usually a Fe-Ni alloy, stretched with some force between two clamps 2 and 3. At least one of these clamps 2 and 3 contains a damper 4 to suppress the oscillation of magnetostrictive wire 1 and to prevent the sound waves propagating along the wire from reflecting from this end. The example of FIG. 1 illustrates this damper 4 at the head end of the magnetostrictive displacement transducer. Return wire 5 is coupled to magnetostrictive wire 1 at the foot end. Together magnetostrictive wire 1 and return wire 5 form a complete electrical loop. Pick-up coil 6 detects the magnetostrictive response of magnetostrictive wire 1 and produces a corresponding electrical signal. Permanent magnet 7 is movable along the measurement range of magnetostrictive wire 1 and marks the displacement to be detected. Driver 8 periodically supplies an electrical pulse 11 to the loop consisting of magnetostrictive wire 1 and return wire 5 for exciting the magnetostrictive response. Amplifier 9 amplifies the magnetostrictive response detected by pick-up coil 6. Logic circuit 10 employs the amplified magnetostrictive response from amplifier 9 for detection of the displacement of permanent magnet 7 within the measurement range of magnetostrictive wire 1. Logic circuit 10 may include a simple timer circuit or may include a sophisticated computer control system depending on the particular application.

Driver 8 periodically sends electrical pulses 11, which are called interrogation pulses, into magnetostrictive wire 1. The electrical current of this interrogation pulse 11 generates a circumferential magnetic field 12 around magnetostrictive wire 1. The permanent magnet 7 generates an axial magnetic field 13 in its vicinity. The combined action of these two magnetic fields produces a helicoidally shaped magnetic field pulse 14. This helicoidally shaped magnetic field pulse 14 causes a torsional ultrasonic wave to propagate along magnetostrictive wire 1 in both directions from permanent magnet 7 due to the magnetostrictive effect. When this ultrasonic wave passes pick-up coil 6, the change in the magnetic flux due to the reverse magnetostrictive effect generates an electrical signal. Since the speed of propagation of this torsional ultrasonic wave in any given wire is constant, the time interval between the interrogation pulse and the detected electrical signal represents an accurate measure of the distance between pick-up coil 6 and permanent magnet 7. Permanent magnet 7 can, for example, be attached to a moving part of a machine in order to measure the position of this part, or it can be built into a float allowing to measure a level of liquid in the reservoir. The magnetostrictive displacement transducer can also be used to measure more than one distance or level if two or more magnets are positioned along the magnetostrictive wire.

It must be understood that the principle of the proposed invention can be utilized in any application of the magnetostrictive displacement transducer. There could be a number of variations in the design of the magnetostrictive displacement transducer. Other structures can be used to detect the torsional ultrasonic pulse. For example, a piezoelectric crystal can be used as a means of the signal pick up instead of the coil. Alternatively, one or more thin magnetostrictive tapes can be welded to the wire with a pick-up coil or coils located around each tape. The roles of interrogation and detection may be reversed. Such a "reverse" magnetostrictive displacement transducer is interrogated by directly generating a torsional ultrasonic wave with, for example, a piezoelectric crystal. The response is an electrical signal developed across the magnetostrictive wire due to the magnetostrictive effect. The electrical response in this case is similarly a damped sine wave. Regardless of the implementation, the present invention is equally applicable to any magnetostrictive displacement transducer.

Figure 2:
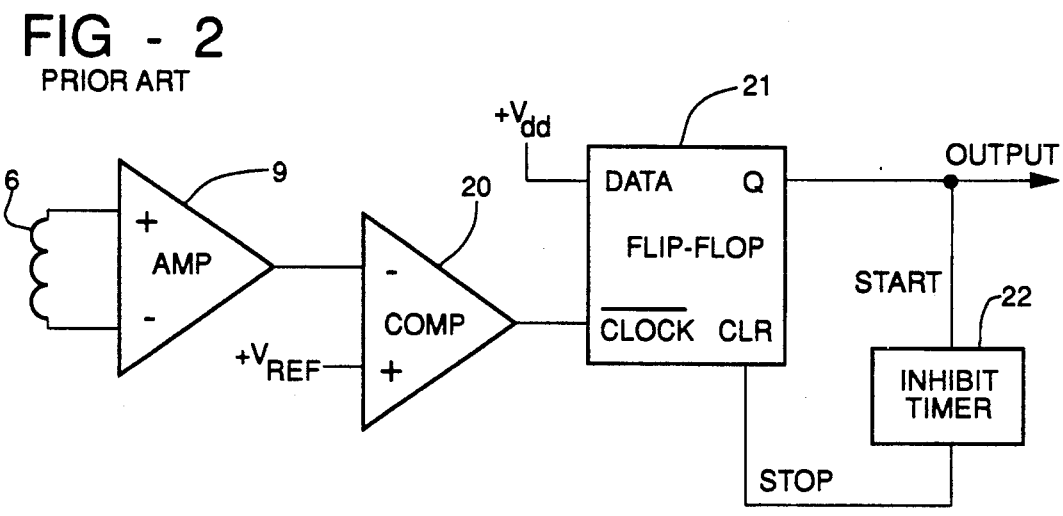
FIG. 2 illustrates a circuit of the known type used in detection of the magnetostrictive displacement transducer response.
Figure 3A:
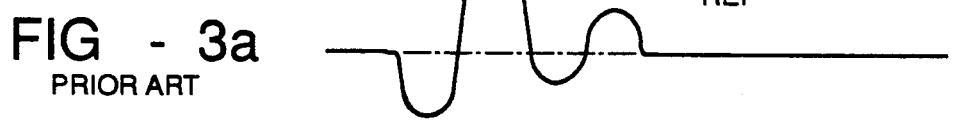
FIGS. 3a to 3d illustrate examples of wave forms typically encountered in the circuit of FIG. 2.
Figure 3B:

FIG. 2 shows some details of the electronic circuits used in a typical prior art magnetostrictive displacement transducer. Pick-up coil 6 supplies the input terminals of amplifier 9. An inverting input of comparator 20 receives the output of amplifier 9. A positive reference voltage $V_{ref}$ is supplied to the non-inverting input of comparator 20. FIG. 3a illustrates the typical signal wave form 14 at the input of comparator 20, which is a damped sine wave. The level of the reference voltage $V_{ref}$ determines the instant in time when the signal is detected. The reference voltage $V_{ref}$ is set at the level of approximately two thirds of the expected maximum positive signal swing. Setting the reference voltage $V_{ref}$ lower reduces noise immunity. Setting the reference voltage $V_{ref}$ higher may cause significant measurement errors if the signal-reference crossing point moves outside the area of maximum signal slope. It should be understood that errors in measurement are minimized if the reference voltage $V_{ref}$ is within the range of maximum signal slope of signal wave form 14. When the amplitude of signal wave form 14 becomes equal to the reference voltage $V_{ref}$, the output of comparator 20 switches to LOW. FIG. 3b illustrates the output of comparator 20.

Figure 3C:
Figure 3D:
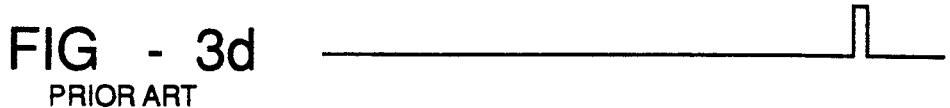

The output of comparator 20 is connected to the inverting clock input of flip flop 21. The positive supply voltage $V_{dd}$ supplies the data input of flip-flop 21. The LOW output of comparator 20 triggers flip-flop 21 which latches the data. FIG. 3c illustrates the output of flip-flop 21. The positive going transition of this output of flip-flop 21 is the detected time of arrival of the magnetostrictive response and is used in the magnetostrictive displacement transducer logic circuits which are not related to the present discussion. This positive going transition at the output of flip-flop 21 also starts an inhibit timer 22. Inhibit timer 22 prevents multiple triggering of flip-flop 21. Such multiple triggerings may occur after transients caused by the interrogation pulse and also may occur after strong signals which can cause multiple triggering of comparator 20. The signal flip-flop 21 stays in its ON state until inhibit timer 22 generates a reset signal. The time interval before inhibit timer 22 generates this reset signal is selected to be longer than the expected length of the damped sine wave signal 14. FIG. 3d illustrates this reset signal.

This prior art circuit requires individual adjustment of the reference voltage $V_{ref}$ for each magnetostrictive displacement transducer in production. The level of the reference voltage $V_{ref}$ determines instant of time of detection of the signal wave form 14. Even properly adjusted devices may give erroneous readings due to changes in signal strength, gain and/or reference voltage.

Figure 4:
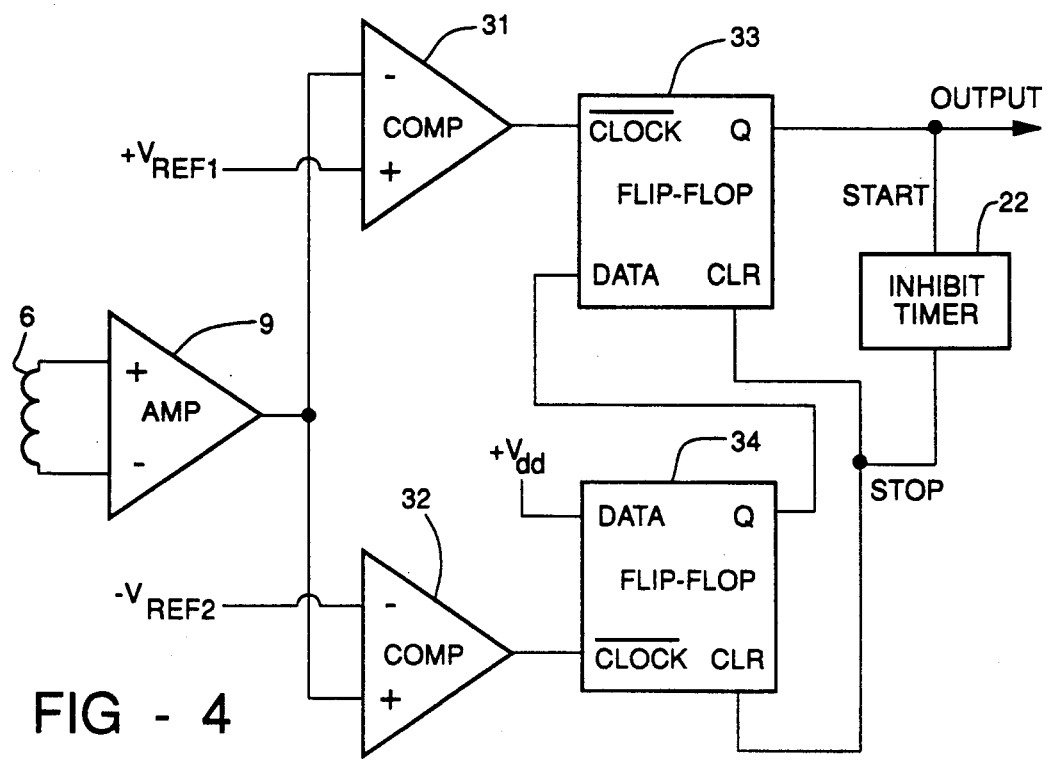
FIG. 4 illustrates a circuit of a first embodiment of this invention used in detection of the magnetostrictive displacement transducer response.

An improved circuit according to this invention is shown in FIG. 4. The output of amplifier 9 supplies two comparators. The output signal supplies the inverting input of comparator 31 and the non-inverting input of comparator 32. The inverting input of comparator 32 receives a negative reference voltage $-V_{ref2}$ and the non-inverting input of comparator 31 receives a zero or small positive reference voltage $+V_{ref1}$. The output of comparator 31 is connected to the inverting clock input of a signal flip-flop 33. The output of comparator 32 is connected to the inverting clock input of a pretrigger flip-flop 34. The data input of pretrigger flip-flop 34 receives the positive supply voltage $V_{dd}$. The output of pretrigger flip flop 34 is connected to the data input of the signal flip-flop 33. Thus, signal flip-flop 33 can be switched into the ON state only if pretrigger flip-flop 34 is already set ON.

Reference voltage $-V_{ref2}$ is set at about ⅔ of the maximum expected negative swing of the signal. Reference voltage $+V_{ref1}$ may be set at any level between $-V_{ref2}$ and the maximum positive swing of the signal. The best setting is believed to be at slightly above zero level, for example 100 millivolts. Both signal flip-flop 33 and pretrigger flip-flop 34 remain triggered until reset by inhibit timer 22. Thus the circuit of FIG. 4 requires the receipt of a negative going signal less than $-V_{ref2}$ followed by a positive going signal above $+V_{ref1}$.

Figure 5A:
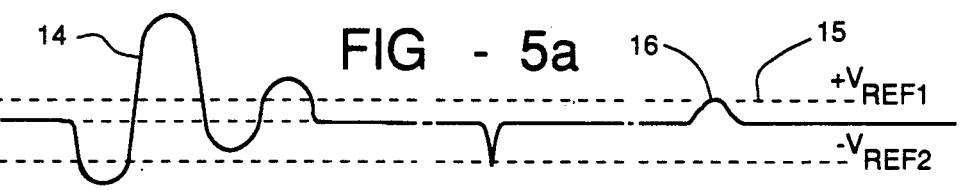
Figure 5B:
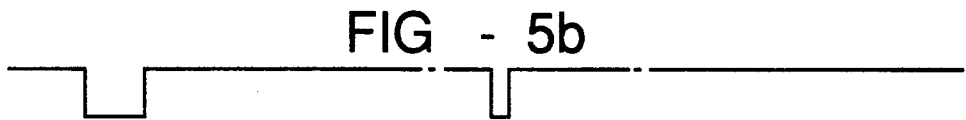
Figure 5C:
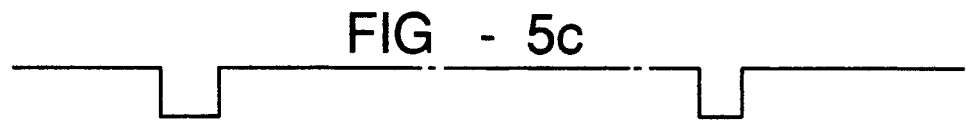
Figure 5D:
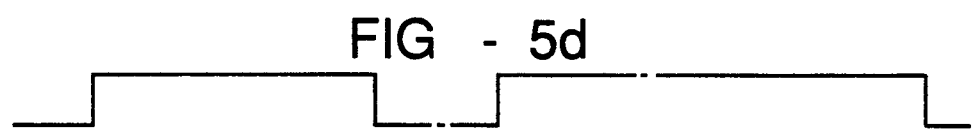
Figure 5E:
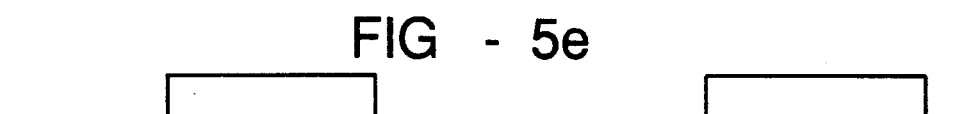
Figure 5A:
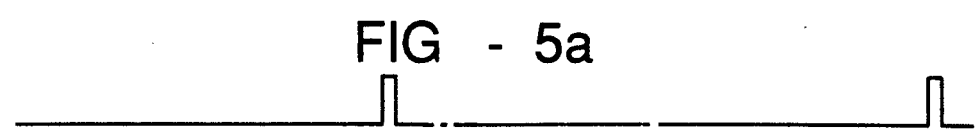

The circuit illustrated in FIG. 4 has the advantage that signal flip-flop 33 is always triggered in the area of the steepest slope of the signal wave form 14. FIG. 5b illustrates the output of comparator 32, which is triggered when signal wave form 14 falls below $-V_{ref2}$. Comparator 32 turns ON pre-trigger flip-flop 34 as shown in FIG. 5d. When signal wave form 14 rises above $+V_{ref1}$ comparator 31 is triggered as shown in FIG. 5c. Since pretrigger flip-flop 32 in already ON, signal flip-flop 33 turns ON producing the circuit output. Since $+V_{ref1}$ is set near the zero crossing of signal wave form 14, this output is within the area of the steepest slope. Thus the measurements are stable even with variations of the amplifier gain and reference voltage levels.

The circuit of FIG. 4, while advantageous from the standpoint of accurate measurement, has a limited noise immunity. This is shown in FIGS. 5a to 5f. FIG. 5a illustrates a proper magnetostrictive response signal wave form 14, a negative going noise spike 15 and a positive going noise pulse 16. FIG. 5b illustrates the output of comparator 32. Since often the negative swing of signal wave form 14 is about 40 to 60% of its positive swing, the absolute value of $-V_{ref2}$ must be correspondingly 40 to 60% of $V_{ref}$ in the circuit FIG. 2. The negative noise spike 15 trips comparator 32 and turns pretrigger flip-flop 34 ON. If this happens then any small positive noise, such as noise pulse 16, causes a false signal. Note that $+V_{ref1}$ is set near zero, thus after such a negative noise spike even a small amount of noise at the amplifier output will falsely trigger signal flip-flop 33.

Figure 6:
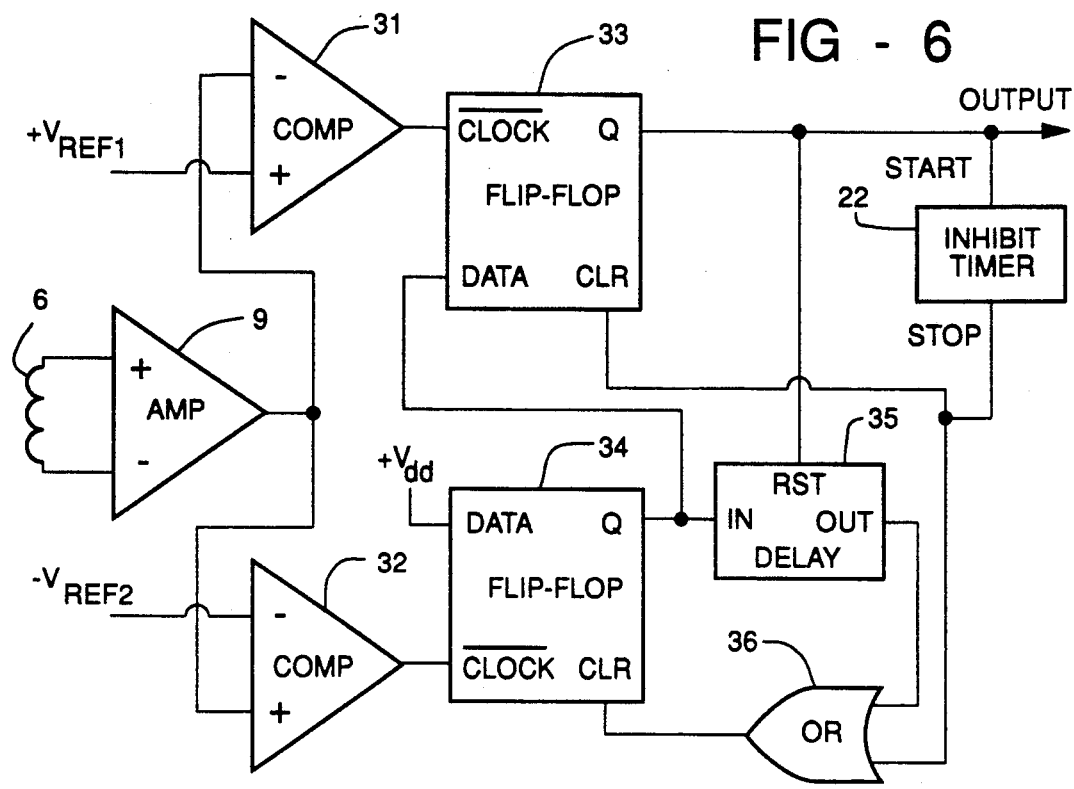
FIG. 6 illustrates a circuit of a second embodiment of this invention used in detection of the magnetostrictive displacement transducer response.

A proposed further improved circuit is illustrated in FIG. 6. This circuit is similar to that of FIG. 4 except that every time comparator 32 triggers pretrigger flip-flop 34, flip-flop 34 also enables a delay timer 35. Delay timer 35 is set for a very short interval, typically a few microseconds. This delay should be longer than the longest expected interval between the triggering of pretrigger flip-flop 34 and the triggering of signal flip-flop 32 for a normal signal wave form 14. Delay timer 35 clears pretrigger flip-flop 34 via OR gate 36 when its time expires. The circuit of FIG. 6 works the same way as that of FIG. 4 for a normal signal wave form 14. Note that signal flip-flop 33 resets and disables delay timer 35 when triggered. The normal reset signal from the inhibit timer clears pretrigger flip-flop 34 via OR gate 36. Thus delay timer 35 fails to time out and does not alter normal signal detection.

Figure 7A:
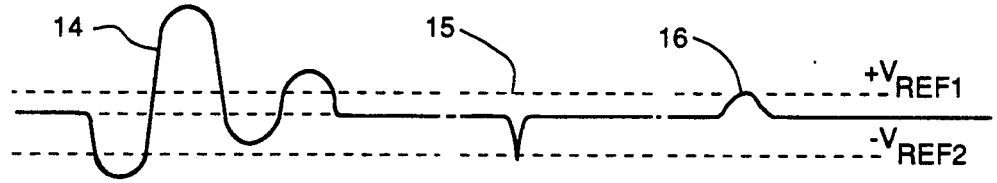
FIGS. 7a to 7g illustrate examples of wave forms typically encountered in the circuit of FIG. 6.
Figure 7B:
Figure 7C:
Figure 7D:
Figure 7E:
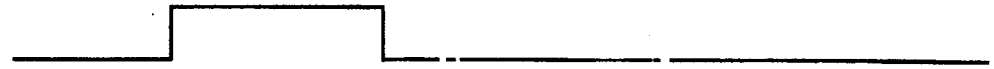
Figure 7F:
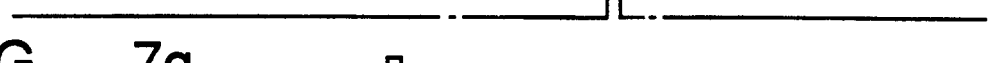
Figure 7G:

Delay timer 35 serves to prevent false triggerings due to negative noise spikes. If a negative noise spike 16 occurs, as illustrated in FIG. 7a, delay timer 35 times out and resets pretrigger flip-flop 34 (see FIG. 7f). This generally occurs before receipt of positive noise signal 16 above $+V_{ref1}$. Thus false triggering due to the negative noise spike is prevented and the circuit is reset to receive a "normal" signal. This circuit effectively requires comparator 31 to trip before delay timer 35 times out in order to make a signal detection. This greatly reduces the interval during which the circuit is vulnerable to false triggerings on noise.

We claim:
1. An apparatus for detecting a damped sine wave signal on an input line comprising:
   a first comparator having a non-inverting input connected to the input line, an inverting input connected to a predetermined negative threshold voltage, and an output generating a first output signal when the level of the signal on the input line falls below said predetermined negative threshold voltage;
   a first latch circuit having a data input connected to a first predetermined positive voltage, a clock input connected to said output of said first comparator and an output for generating a first latch signal upon receipt of said first output signal;
   a second comparator having an inverting input connected to the input line, a non-inverting input connected to a second predetermined positive threshold voltage, and an output generating a second output signal when the level of the signal on the input line rises above said second predetermined positive threshold voltage;
   a second latch circuit having a data input connected to said output of said first latch circuit, a clock input connected to said output of said second comparator and an output for generating a second latch signal if said data input receives said first latch signal upon receipt of said second output signal, said second latch signal indicating detection of the damped sine wave.

2. The apparatus as claimed in claim 1, wherein:
said predetermined negative threshold voltage of said first comparator circuit is about ⅔ of expected maximum negative voltage swing of the damped sine wave signal.

3. The apparatus as claimed in claim 1, wherein:
said predetermined positive threshold voltage of said second comparator circuit is about 100 millivolts.

4. The apparatus as claimed in claim 1, wherein:
said first latch circuit further includes a reset input for resetting said output to cease generating said first latch signal upon receipt of a reset signal on said reset input;
said second latch circuit further includes a reset input for resetting said output to cease generating said second latch signal upon receipt of a reset signal on said reset input; and said apparatus further comprises an inhibit timer circuit having a start input connected to said output of said second latch circuit and an end output connected to said reset input of said first and second latch circuits for generating said reset signal at said end output a predetermined interval of time following receipt of said second latch signal at said start input, thereby resetting said first and second latch circuits.

5. The apparatus as claimed in claim 4, wherein:
said predetermined interval of time of said inhibit timer circuit is longer than the maximum expected duration of the damped sine wave signal.

6. The apparatus as claimed in claim 1, wherein:
said first latch circuit further includes a reset input for resetting said output to cease generating said first latch signal upon receipt of a reset signal on said reset input; and said apparatus further comprises a delay timer circuit having a start input connected to said output of said first latch circuit and an end output connected to said reset input of said first latch circuit for generating said reset signal at said end output a predetermined interval of time following receipt of said first latch signal at said start input, thereby resetting said first latch circuit.

7. The apparatus as claimed in claim 6, wherein:
said predetermined interval of time of said delay timer circuit is greater than the maximum expected length of time between the time when the damped sire wave falls below said predetermined negative threshold voltage and the time when the damped sine wave rises above said predetermined positive threshold voltage.

8. The apparatus as claimed in claim 6, wherein:
said delay timer further includes a reset input connected to said output of said second latch circuit for resetting without generation of said reset signal upon receipt of said second latch signal.

9. The apparatus as claimed in claim 1, wherein:
said first latch circuit further includes a reset input for resetting said output to cease generating said first latch signal upon receipt of a reset signal on said reset input;

said second latch circuit further includes a reset input for resetting said output to cease generating said second latch signal upon receipt of a reset signal on said reset input;

said apparatus further comprises:
an OR gate having first and second inputs and an output connected to said reset input of said first latch circuit;

an inhibit timer circuit having a start input connected to said output of said second latch circuit and an end output connected to said reset input of said second latch circuit and to said first input of said OR gate for generating a first reset signal at said end output a first predetermined interval of time following receipt of said second latch signal at said start input, thereby resetting said first and second latch circuits; and a delay timer circuit having a start input connected to said output of said first latch circuit and an end output connected to said second input of said OR gate for generating a second reset signal at said end output a second predetermined interval of time following receipt of said first latch signal at said start input, said second predetermined interval of time being shorter than said first predetermined interval of time, thereby resetting said first latch circuit.

10. The apparatus as claimed in claim 9, wherein:
said delay timer further includes a reset input connected to said output of said second latch circuit for resetting without generation of said second reset signal upon receipt of said second latch signal.

11. The apparatus as claimed in claim 9, wherein:
said first predetermined interval of time of said inhibit timer circuit is longer than the maximum expected duration of the damped sine wave signal; and said second predetermined interval of time of said delay timer circuit is greater than the maximum expected length of time between the time when the damped sine wave falls below said predetermined negative threshold voltage and the time when the damped sine wave rises above said predetermined positive threshold voltage.

12. A magnetostrictive linear displacement detector comprising:
a magnetostrictive wire having opposite head and a foot ends defining a measurement interval therebetween;

a return wire having a foot end electrically coupled to said foot end of said magnetorestrictive wire and a head end;

a magnet disposed for displacement along the said magnetostrictive wire within said measurement interval, the position of said magnet within said measurement interval being the linear displacement detected;

an electrical excitation means electrically coupled to said head end of said magnetostrictive wire and said head end of said return wire for producing a predetermined electrical excitation through said magnetostrictive wire and said return wire;

a torsional motion sensor disposed proximate to said head end of said magnetostrictive wire for generating an electrical indication of torsional motion within said magnetostrictive wire; and a displacement determination means connected to said electrical excitation means and said torsional motion sensor for detecting the position of said magnet within said measurement interval of said magnetostrictive wire from the interval of time between producing said predetermined electrical excitation and the detection of the torsional motion within said magnetostrictive wire induced by said electrical excitation traveling, said displacement determination means including a first comparator having a non-inverting input connected to the input line, an inverting input connected to a predetermined negative threshold voltage, and an output generating a first output signal when the level of the signal on the input line falls below said predetermined negative threshold voltage;

a first latch circuit having a data input connected to a first predetermined positive voltage, a clock input connected to said output of said first comparator and an output for generating a first latch signal upon receipt of said first output signal;

a second comparator having an inverting input connected to the input line, a non-inverting input connected to a second predetermined positive threshold voltage, and an output generating a second output signal when the level of the signal on the input line rises above said second predetermined positive threshold voltage;

a second latch circuit having a data input connected to said output of said first latch circuit, a clock input connected to said output of said second comparator and an output for generating a second latch signal if said data input receives said first latch signal upon receipt of said second output signal, said second latch signal indicating detection of the damped sine wave.

13. The magnetostrictive linear displacement detector as claimed in claim 12, wherein:

said predetermined negative threshold voltage of said first comparator circuit is about ⅔ of expected maximum negative voltage swing of the damped sine wave signal.

14. The magnetostrictive linear displacement detector as claimed in claim 12, wherein:

said predetermined positive threshold voltage of said second comparator circuit is about 100 millivolts.

15. The magnetostrictive linear displacement detector as claimed in claim 12, wherein:

said first latch circuit further includes a reset input for resetting said output to cease generating said first latch signal upon receipt of a reset signal on said reset input;

said second latch circuit further includes a reset input for resetting said output to cease generating said second latch signal upon receipt of a reset signal on said reset input; and said displacement determination means further includes an inhibit timer circuit having a start input connected to said output of said second latch circuit and an end output connected to said reset input of said first and second latch circuits for generating said reset signal at said end output a predetermined interval of time following receipt of said second latch signal at said start input, thereby resetting said first and second latch circuits.

16. The magnetostrictive linear displacement transducer as claimed in claim 15, wherein:

said predetermined interval of time of said inhibit timer circuit is longer than the maximum expected duration of the damped sine wave signal.

17. The magnetostrictive linear displacement transducer as claimed in claim 12, wherein:

said first latch circuit further includes a reset input for resetting said output to cease generating said first latch signal upon receipt of a reset signal on said reset input; and said displacement determination means further includes a delay timer circuit having a start input connected to said output of said first latch circuit and an end output connected to said reset input of said first latch circuit for generating said reset signal at said end output a predetermined interval of time following receipt of said first latch signal at said start input, thereby resetting said first latch circuit.

18. The magnetostrictive linear displacement transducer as claimed in claim 17, wherein:

said predetermined interval of time of said delay timer circuit is greater than the maximum expected length of time between the time when the damped sine wave falls below said predetermined negative threshold voltage and the time when the damped sine wave rises above said predetermined positive threshold voltage.

19. The magnetostrictive linear displacement transducer as claimed in claim 17, wherein:

said delay timer further includes a reset input connected to said output of said second latch circuit for resetting without generation of said reset signal upon receipt of said second latch signal.

20. The magnetostrictive linear displacement transducer as claimed in claim 12, wherein:

said first latch circuit further includes a reset input for resetting said output to cease generating said first latch signal upon receipt of a reset signal on said reset input;

said second latch circuit further includes a reset input for resetting said output to cease generating said second latch signal upon receipt of a reset signal on said reset input;

said displacement determination means further includes an OR gate having first and second inputs and an output connected to said reset input of said first latch circuit;

an inhibit timer circuit having a start input connected to said output of said second latch circuit and an end output connected to said reset input of said second latch circuit and to said first input of said OR gate for generating a first reset signal at said end output a first predetermined interval of time following receipt of said second latch signal at said start input, thereby resetting said first and second latch circuits; and a delay timer circuit having a start input connected to said output of said first latch circuit and an end output connected to said second input of said OR gate for generating a second reset signal at said end output a second predetermined interval of time following receipt of said first latch signal at said start input, said second predetermined interval of time being shorter than said first predetermined interval of time, thereby resetting said first latch circuit.

21. The magnetostrictive linear displacement transducer as claimed in claim 20, wherein:

said delay timer further includes a reset input connected to said output of said second latch circuit for resetting without generation of said second reset signal upon receipt of said second latch signal.

22. The magnetostrictive linear displacement transducer as claimed in claim 20, wherein:

said first predetermined interval of time of said inhibit timer circuit is longer than the maximum expected duration of the damped sine wave signal; and said second predetermined interval of time of said delay timer circuit is greater than the maximum expected length of time between the time when the damped sine wave falls below said predetermined negative threshold voltage and the time when the damped sine wave rises above said predetermined positive threshold voltage.

23. A method for detecting a damped sine wave signal having an expected duration of a plurality of periods comprising the steps of:

detecting when the level of the signal falls below a predetermined negative threshold;

detecting when the level of the signal rises above a predetermined positive threshold;

generating a detection signal when the signal is detected rising above said predetermined positive threshold following being detected falling below said predetermined negative threshold;

preventing more than one detection signal in the duration of a given damped sine wave signal by maintaining said detection signal a first predetermined interval of time following initial generation of said detection signal wherein said first predetermined interval of time is longer than the maximum expected duration of the damped sine wave signal.

24. The method for detecting a damped sine wave as claimed in claim 23, wherein:

said step of generating said detection signal occurs only if the signal is detected rising above said predetermined positive threshold within a second predetermined interval of time following being detected falling below said predetermined negative reference threshold, said second predetermined interval of time being less than said first predetermined interval of time.

25. The method for detecting a damped sine wave as claimed in claim 24, wherein:

said second predetermined interval of time is longer than the maximum expected length of time between the time when the damped sine wave falls below said predetermined negative threshold voltage and the time when the damped sine wave rises above said predetermined positive threshold voltage.

26. The method for detecting a damped sine wave as claimed in claim 23, wherein the damped sine wave consists of the response of a magnetostrictive position detector to an excitation signal, the magnetostrictive position detector having a magnetostrictive wire with a known rate of torsional motion in response to the excitation signal, further comprising the step of:

determining position based upon the time from the excitation signal until generation of said detection signal and the rate of torsional motion within the magnetostrictive wire.

* * * * *